United States Patent
Moretz

[11] Patent Number: 6,013,000
[45] Date of Patent: Jan. 11, 2000

[54] POLYMERIC CHAIN GUIDE

[75] Inventor: Ralph D. Moretz, Jackson, Mich.

[73] Assignee: TMJ Properties, L.L.C., Jackson, Mich.

[21] Appl. No.: 09/133,967

[22] Filed: Aug. 14, 1998

[51] Int. Cl.[7] ........................................... F16H 7/08
[52] U.S. Cl. ................................ 474/111; 474/140
[58] Field of Search ........................ 474/111, 109, 474/138, 135, 140, 113–117, 119; 264/255

[56] References Cited

U.S. PATENT DOCUMENTS

| | | | |
|---|---|---|---|
| 2,963,918 | 12/1960 | Blakstad . | |
| 3,407,674 | 10/1968 | Pearce et al. . | |
| 4,921,472 | 5/1990 | Young . | |
| 5,045,032 | 9/1991 | Suzuki et al. ........................... | 474/140 |
| 5,088,966 | 2/1992 | Suzuki et al. . | |
| 5,184,983 | 2/1993 | Shimaya et al. ..................... | 474/140 X |
| 5,266,066 | 11/1993 | White . | |
| 5,318,482 | 6/1994 | Sato et al. ............................... | 474/111 |
| 5,462,493 | 10/1995 | Simpson . | |
| 5,647,811 | 7/1997 | Mott ..................................... | 474/111 X |
| 5,690,569 | 11/1997 | Ledvina et al. ......................... | 474/111 |
| 5,820,502 | 10/1998 | Shulze ................................... | 474/111 X |

*Primary Examiner*—David A. Bucci
*Assistant Examiner*—Marcus Charles
*Attorney, Agent, or Firm*—Young & Basile, P.C.

[57] ABSTRACT

A chain guide for maintaining the tension within roller chains such as used in timing systems for internal combustion engines which directly engages the chain to maintain the proper tension. The chain guide is formed of a polymeric synthetic material reinforced with carbon fiber to prevent contamination of the engine lubricants. The chain guide may be formed as a single one piece synthetic construction, or may consist of a synthetic portion having the wear surface defined thereon and a rigid backing member for support.

6 Claims, 1 Drawing Sheet

POLYMERIC CHAIN GUIDE

BACKGROUND OF THE INVENTION

1. Field of the Invention

The invention pertains to guides for roller chain producing tensioning of the chain by lateral chain displacement.

2. Description of the Related Art

Chain guides such as those used to maintain the tension within the roller timing chain systems in internal combustion engines laterally displace the chain "inwardly" intermediate sprockets to maintain a predetermined tension on the chain in order to insure proper timing of the cylinder ignition sequences.

For many years, internal combustion engine timing chain guides have utilized synthetic material defining the wear surface which engages the chain, as shown in U.S. Pat. Nos. 2,963,918, 3,407,674, 4,921,472, 5,266,066, 5,462,493, and the like. As will be appreciated from these patents, self-lubricating synthetic plastic material, such as nylon, is commonly used to define the wear surface engaging the roller chain.

While such prior art devices are commonly used, the wear surface, and adjacent body, is usually formed of an unreinforced nylon or similar polymer, and even though such material is self-lubricating, wear occurs and periodic replacement of the chain guide is required.

It would be possible to reinforce the nylon with a fiberglass reinforcement utilizing glass fiber strands. However, such a reinforcement of the nylon would be unacceptable as it would produce an increased wear on the chain, and the glass fibers would separate from the guide material in minute amounts and contaminate engine lubricants and destroy critical wear surfaces.

Previously, a long wearing chain guide has heretofore not been available for internal combustion engine timing chain systems.

OBJECTS OF THE INVENTION

It is an object of the invention to provide a self-lubricating chain guide acceptable for use with internal combustion engine roller chain timing systems which is reinforced, and wherein the reinforcing material adds to the lubricating aspects of the chain guide material, and the reinforcing material does not contaminate engine lubricants or deteriorate engine bearings.

A further object of the invention is to provide a chain guide for internal combustion engine roller chain timing systems utilizing a synthetic material such as nylon which is reinforced with carbon fibers and wherein the reinforcing material aids in the lubrication of the chain on the guide, and carbon fibers separated from the guide will not degrade the lubricating qualities of the engine oil or create wear at other critical engine interfaces.

Yet another object of the invention is to provide a roller chain guide for internal combustion engine timing systems utilizing a polymer, preferable self-lubricating, which is reinforced with stranded carbon fibers, and the length of the carbon fibers is generally oriented parallel to the direction of movement of the chain over the guide wear surface.

SUMMARY OF THE INVENTION

Basically, the crux of the inventive concept is directed to the use of carbon fiber as a reinforcing material used in conjunction with polymer type roller chain guides as employed with internal combustion engine timing systems. Preferably, the polymer used is of a self-lubricating type, such as nylon, and, preferably, the carbon fiber reinforcement is in the form of longitudinally disposed strands generally oriented within the guide as to be generally parallel to the direction of movement of the chain on the guide wear surface.

The polymeric chain guide in accord with the invention may be formed as a single piece of polymer having mounting means homogeneously defined thereon whereby the chain guide may be attached to engine structure as desired. However, it is also possible to affix the polymeric portion of the chain guide to a relatively rigid mount or base substrate having mounting features defined thereon whereby the polymeric material may be mechanically or chemically affixed to its substrate.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
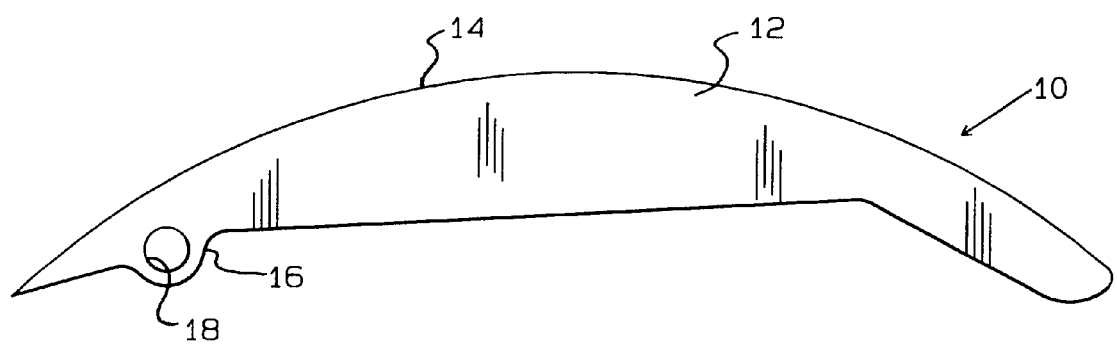
FIG. 1 is a side elevational view of a polymeric chain guide formed in accord with the invention which is of a single homogeneous construction, the chain guide mounting elements being directly formed in the polymeric material.

In FIG. 1, a one piece chain guide embodiment is illustrated as generally designated by reference numeral 10. The guide 10 includes a polymeric body 12 preferably formed of a self-lubricating synthetic polymer such as nylon or the like. The body 12 may be molded by conventional injection equipment and may be accurately constructed quickly and economically. The body 12 includes a convex wear surface 14 which the internal combustion engine roller chain, not shown, contacts during operation, such as shown in U.S. Pat. No. 5,266,066. The lower side of the body 12 includes a transversely extending rib 16 homogeneously defined therein through which the mounting hole 18 extends. In a similar manner, a transversely extending rib 20 is formed adjacent the right end of the body 12 and includes a recess or depression 22 adapted to receive adjusting or mounting structure, not shown, for positioning the chain guide relative to the engine and chain during use.

The polymeric body 12 is reinforced by carbon fibers of the type such as manufactured by DSM Engineering Plastics of Evansville, Ind. Such carbon fibers are of a longitudinal strand configuration and, preferably, the general length of the carbon fiber strands are oriented substantially parallel to the direction of chain movement relative to the wear surface 14, i.e. the longitudinal length of the body 12.

The use of carbon fiber reinforcement with the polymeric body permits a much lower loading than if a glass fiber reinforcement was used as carbon fiber is many times stiffer than glass fiber. A carbon fiber reinforced body 12 is of a light weight, and the carbon fibers lying upon the wear surface 14 add to the lubricating aspects of the body 12 as wear of the surface 14 occurs.

Carbon fiber particles which may be worn from the body 12 and find their way into the engine lubricating oil will not degrade the lubricating qualities of the oil, and such small carbon fiber particles will not deteriorate engine bearings and other critical areas, as would be the case if glass fiber particles should enter the lubricating oils.

While the cost of carbon fiber material is higher than that of glass fiber material, the lighter weight, the lower loading, and inexpensive single piece construction of the embodiment shown in FIG. 1 results in considerable savings in the manufacture of the final product as ready for use.

Figure 2:
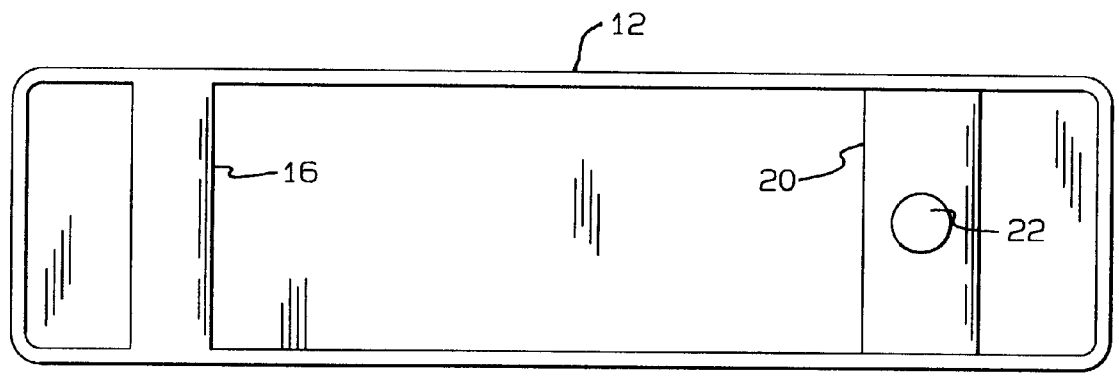
FIG. 2 is a bottom view of the chain guide of FIG. 1.
Figure 3:
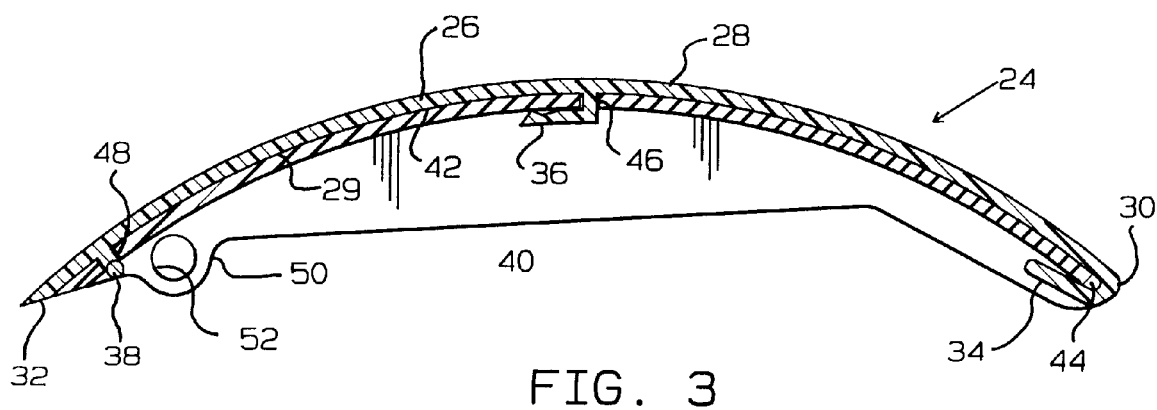
FIG. 3 is an elevational longitudinal sectional view of another embodiment of a chain guide which is of a two piece construction utilizing a polymeric chain engaging material mounted upon a metallic substrate on which the mounting elements are formed.

In FIG. 3, a two piece chain guide 24 is illustrated having many of the advantages of the embodiment shown with respect to FIGS. 1 and 2.

In the embodiment of FIG. 3, the two piece guide 24 includes a thin polymeric body 26 having an exterior convex wear surface 28 and a concave under surface 29. The body 26 includes a leading edge 30 and a trailing edge 32, so named in reference to the direction of roller chain movement, not shown, relative to the wear surface 28.

The polymeric body leading edge 30 includes a bent over lip 34, whose purpose is later described, a central tab 36, and a rear tab 38. The tabs 36 and 38 homogeneously extend from the body under surface 29.

A stiff base member or substrate 40 supports the relatively thin polymeric body 26. The base 40 may be formed of steel, aluminum, very rigid synthetic plastic material, or other high strength stiff material. The base 40 includes a convex support surface 42 upon which the complementary shaped body under surface 29 engages as will be apparent from FIG. 3. The base 40 includes a leading edge 44 about which the polymeric body lip 34 extends thereby resisting relative longitudinal movement between the body 26 and the base 40. A central hole 46 defined in the base 40 receives the tab 36, while the base rear hole 48 receives the rear tab 38. In this manner, the polymeric body 26 is firmly mechanically affixed to the base 40.

The underside of the base 40 includes a rib 50 in which the mounting hole 52 is formed, and a pivot pin, or other mounting structure for the chain guide, not shown, will extend through the hole 52.

It will be appreciated that the aforedescribed advantages of utilizing a polymeric body chain guide reinforced by carbon fibers produces a long wearing chain guide which will not deleteriously affect the engine lubricants, and it is appreciated that various modifications to the inventive concepts may be apparent to those skilled in the art without departing from the spirit and scope of the invention.

I claim:

1. A chain guide and tensioner comprising an elongated body, mounting means defined on said body, a wear surface defined on said body adapted to be engaged by a chain, said wear surface comprising a polymer reinforced with imbedded carbon fibers, said carbon fibers comprising elongated strands having a length, the length of said strands being oriented on said wear surface in a direction generally parallel to the direction of chain movement across said wear surface.

2. In a chain guide and tensioner as in claim 1 wherein said mounting means and said wear surface are homogeneously defined by a polymer material reinforced with carbon fibers.

3. In a chain guide and tensioner as in claim 1, said body comprising first and second members, said first member being mounted on said second member, said wear surface being defined on said first member, said mounting means defined on said second member, and attachment means attaching said first member to said second member.

4. In a chain guide and tensioner as in claim 3, said second member being formed of metal.

5. In a chain guide and tensioner as in claim 3, said attachment means comprising openings defined in said second member and tabs defined in said first member received within said openings.

6. In a chain guide and tensioner as in claim 5, said attachment means including a bent back lip defined on said first member bent around an edge defined on said second member.

* * * * *